(12) United States Patent
Hileman et al.

(10) Patent No.: US 6,375,081 B1
(45) Date of Patent: Apr. 23, 2002

(54) BUSINESS FORM INCLUDING SMART CARD AND SMART CARD READER

(75) Inventors: Martin H. Hileman, Beavercreek; Daniel D. Thaxton, New Lebanon; R. David Fehrman, Dayton, all of OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 09/492,489

(22) Filed: Jan. 27, 2000

Related U.S. Application Data

(62) Division of application No. 60/118,304, filed on Feb. 2, 1999.

(51) Int. Cl.[7] ............................................... G06K 19/00
(52) U.S. Cl. ...................... 235/487; 235/487; 235/486; 235/449; 235/444
(58) Field of Search ................................ 235/487, 486, 235/449, 444

(56) References Cited

U.S. PATENT DOCUMENTS

| | | | |
|---|---|---|---|
| 3,631,630 A | * 1/1972 | Buffington et al. | ............ 49/402 |
| 4,467,335 A | 8/1984 | Schidt et al. | |
| 5,015,830 A | * 5/1991 | Masuzawa et al. | ......... 235/441 |
| 5,080,225 A | * 1/1992 | Russo et al. | ................ 206/204 |
| 5,252,815 A | 10/1993 | Pernet | |
| 5,427,832 A | 6/1995 | Longtin | |
| 5,495,981 A | 3/1996 | Warther | |
| 5,503,434 A | * 4/1996 | Gunn | ............................ 283/67 |
| 5,517,001 A | 5/1996 | Vandenengel | |
| 5,534,372 A | * 7/1996 | Koshizuka et al. | ...... 235/380 X |
| 5,635,701 A | 6/1997 | Gloton | |
| 5,705,243 A | * 1/1998 | Mehta et al. | .............. 428/40.1 |
| 5,725,819 A | * 3/1998 | Onishi et al. | ................ 264/161 |
| 5,734,151 A | 3/1998 | Vandenengel | |
| 5,748,737 A | 5/1998 | Daggar | |
| 5,813,878 A | * 9/1998 | Kuwata et al. | ............. 439/326 |
| 5,821,516 A | 10/1998 | Vandenengel | |
| 5,842,722 A | 12/1998 | Carlson | |
| 5,881,948 A | * 3/1999 | Correll | ........................ 229/123 |
| 5,915,733 A | * 6/1999 | Schnitzer | ..................... 283/108 |

(List continued on next page.)

FOREIGN PATENT DOCUMENTS

JP         409142065 A    *  3/1997

OTHER PUBLICATIONS

Dr. David B. Everett, Smart Card Technology: Introduction to Smart Cards, Smart Card News, Jan. 27, 1999.

*Primary Examiner*—Michael G. Lee
*Assistant Examiner*—Daniel I. Walsh
(74) *Attorney, Agent, or Firm*—Killworth, Gottman, Hagan & Schaeff LLP

(57) ABSTRACT

An improved scheme for shipping and handling Smart Cards and Smart Card readers is provided. In accordance with one embodiment of the present invention, a business form is provided including a mounting ply defining a mounting surface and a card reader defining an upper reader panel and a lower reader panel. The upper reader panel is coupled to the lower reader panel via a reader hinge. The reader hinge is arranged to enable the upper reader panel to pivot relative to the lower reader panel from an open reader position to a closed reader position. The open reader position is characterized by separation of the upper reader panel from the lower reader panel by an angle of approximately 180° about a pivotal axis defined by the reader hinge. The card reader is removably secured to the mounting surface of the mounting ply in the open reader position. The card reader is preferably removably secured to the mounting surface with an adhesive. The business form preferably further comprises at least one integrated circuit card removably coupled to the mounting surface.

23 Claims, 4 Drawing Sheets

U.S. PATENT DOCUMENTS 5,959,281 A * 9/1999 Domiteaux ................. 235/454
6,158,651 A * 12/2000 Mehta et al. .............. 229/92.1
6,176,430 B1 * 1/2001 Finkelstein et al. ......... 235/487
6,199,120 B1 * 3/2001 Tanaka ....................... 710/16
6,210,193 B1 * 4/2001 Ito et al. ..................... 439/326
6,224,109 B1 * 5/2001 Yang ........................... 283/77
6,149,204 A1 * 11/2001 Capser ........................ 283/81

* cited by examiner

BUSINESS FORM INCLUDING SMART CARD AND SMART CARD READER

CROSS-REFERENCE TO RELATED APPLICATIONS

This application claims the benefit of U.S. Provisional Application Ser. No. 60/118,304, filed Feb. 2, 1999.

BACKGROUND OF THE INVENTION

The present invention relates to smart cards, smart card readers, and, more specifically, to such a business form including a Smart Card and a Smart Card reader where the Smart Card and the reader may be printed simultaneously with printing of the form.

A Smart Card or integrated circuit card is a device that includes an integrated circuit which is contained within a standard credit card sized piece of plastic. The primary uses for such integrated circuit cards involve the portable storage and retrieval of data. Hence, a fundamental component of the integrated circuit is a memory module including one or more of the following: ROM, PROM, EPROM, EEPROM, and RAM. Smart Cards also may include a central processing unit (CPU) and/or security logic to control access to the memory module.

Smart Cards typically come in two forms—Smart Cards with contacts and Smart Cards without contacts. The contact type of Smart Card includes a plurality of electrical contacts on its front surface that permit the card to communicate with the outside world by means of a Smart Card reader. The reader includes electrical contacts which mate with the electrical contacts on the front surface of a Smart Card. A Smart Card without such contacts, on the other hand, may communicate with a reader by low frequency electromagnetic radiation or capacitive coupling. Advanced Smart Cards may include a battery, a keypad and an LCD display on the face of the card. However, due to the expense of such advanced cards, typical Smart Cards have no keypad, battery, or display and look like conventional plastic credit cards.

Smart Cards have become more common as the uses for such cards have increased in number. Smart Cards have gained popularity as stored value cards. A stored value card is a card that is purchased or established for a specific monetary amount. That monetary amount is stored as the value of the card. When the cardholder desires to use the stored value card to purchase goods or services, the card is presented at the point of sale and the cost of the goods or services purchased is deducted from the value stored in the card. Stored value cards have been used for subway fare payment and long distance telephone call payment. In addition to being used as stored value cards, Smart Cards can be designed to operate as credit cards, debit cards, ATM cards, calling cards, etc. A Smart Card may also be designed to perform any combination of these various functions. Various Smart Card designs and applications are described in U.S. Pat. No. 4,766,293 (Boston), U.S. Pat. No. 4,868,376 (Lessin et al.), and U.S. Pat. No. 4,874,935 (Younger), the disclosures of which are incorporated herein by reference.

Smart Cards are often shipped through the mail to customers by issuers of such cards. For this purpose, a Smart Card will typically be affixed to a business form which is inserted into an envelope. For those Smart Cards not including a display, keyboard, and battery, it is common that the customer will also be sent a simple Smart Card reader in the same envelope, or under separate cover. The reader allows the customer to access the information contained in the Smart Card and, depending upon the application for which the Smart Card is issued, read out information from the Smart Card's internal memory and display the information. Mailing such readers is a time consuming job which heretofore has been accomplished primarily manually.

Accordingly, there is a need for an improved scheme for shipping and handling Smart Cards and Smart Card readers. Further, the present inventors have recognized the need for a Smart Card that enables one to customize both the Smart Card and the reader with matching information by printing on them the name of the customer to whom these items are sent and the name of the entity sponsoring the card.

BRIEF SUMMARY OF THE INVENTION

These needs are met by the present invention wherein an improved scheme for shipping and handling Smart Cards and Smart Card readers is provided. In accordance with one embodiment of the present invention, a business form is provided comprising a mounting ply defining a mounting surface and a card reader defining an upper reader panel and a lower reader panel. The upper reader panel is coupled to the lower reader panel via a reader hinge. The reader hinge is arranged to enable the upper reader panel to pivot relative to the lower reader panel from an open reader position to a closed reader position. The open reader position is characterized by separation of the upper reader panel from the lower reader panel by an angle of approximately 180° about a pivotal axis defined by the reader hinge. The card reader is removably secured to the mounting surface of the mounting ply in the open reader position. The card reader is preferably removably secured to the mounting surface with an adhesive. The business form preferably further comprises at least one integrated circuit card removably coupled to the mounting surface.

The integrated circuit card may be removably adhered directly to the mounting surface or secured to the card reader and removably coupled to the mounting surface via the card reader. The business form may further comprise an adhesive interposed between the integrated circuit card and the card reader, wherein the adhesive is arranged to secure the integrated circuit card removably to the card reader. The business form may comprise first and second integrated circuit cards removably adhered directly to the mounting surface.

The mounting surface may include an image printed thereon and the card reader may include a corresponding image printed thereon. The business form preferably further comprises at least one integrated circuit card removably coupled to the mounting surface, wherein the mounting surface includes an image printed thereon, and wherein the integrated circuit card includes a corresponding image printed thereon. Alternatively, the mounting surface includes an image printed thereon and the card reader and the integrated circuit card include respective corresponding images printed thereon. The mounting ply may define a window therein and the reader may be removably secured to the mounting surface such that an image printed on the reader is aligned with the window. The card reader may be provided with a sealing gasket arranged to seal an internal region of the card reader in the closed reader position. The card reader may also be provided with foldable projections arranged to fold from a co-planar state to a projected state. The thickness dimension of the card reader in the co-planar state is preferably less than the thickness dimension of the card reader in the projected state.

In accordance with another embodiment of the present invention, a method of generating a business form is provided comprising the steps of: (i) removably securing a card reader to a mounting surface of a mounting ply in an open reader position; (ii) passing the removably secured card reader and the mounting ply through an imaging device; and (iii) operating the imaging device so as to produce an image on a face of at least one of the secured card reader and the mounting ply. The image may be produced on a face of the mounting ply and a corresponding image may be produced on a face of the card reader. The mounting ply may define a window therein and the image may be produced on a portion of the face of the card reader aligned with the window.

The method may further comprise the step of removably coupling at least one integrated circuit card to the mounting ply. The image may be produced on a face of the mounting ply and a corresponding image may be produced on a face of the integrated circuit card. The image may alternatively or additionally be produced on a face of the card reader and a corresponding image may be produced on a face of the integrated circuit card. Further, the image may be produced on a face of the mounting ply and respective corresponding images may be produced on a face of the card reader and a face of the integrated circuit card.

The card reader may be provided with foldable projections arranged to fold from a co-planar state to a projected state and the securing step may be characterized by securement of the card reader to the mounting surface in the co-planar state. The method of generating a business form may further comprise the step of removing the card reader from the mounting ply and folding the foldable projections from the co-planar state into the projected state.

Accordingly, it is an object of the present invention to provide an improved scheme for shipping and handling Smart Cards and Smart Card readers. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
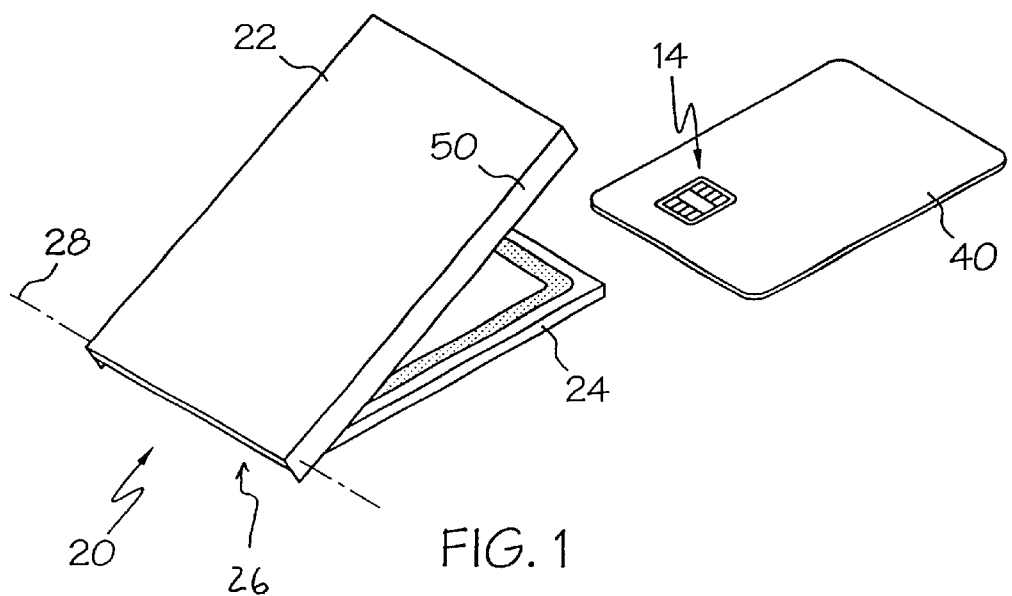
FIG. 1 is an illustration of an un-mounted integrated circuit card and reader according to the present invention.
Figure 2:
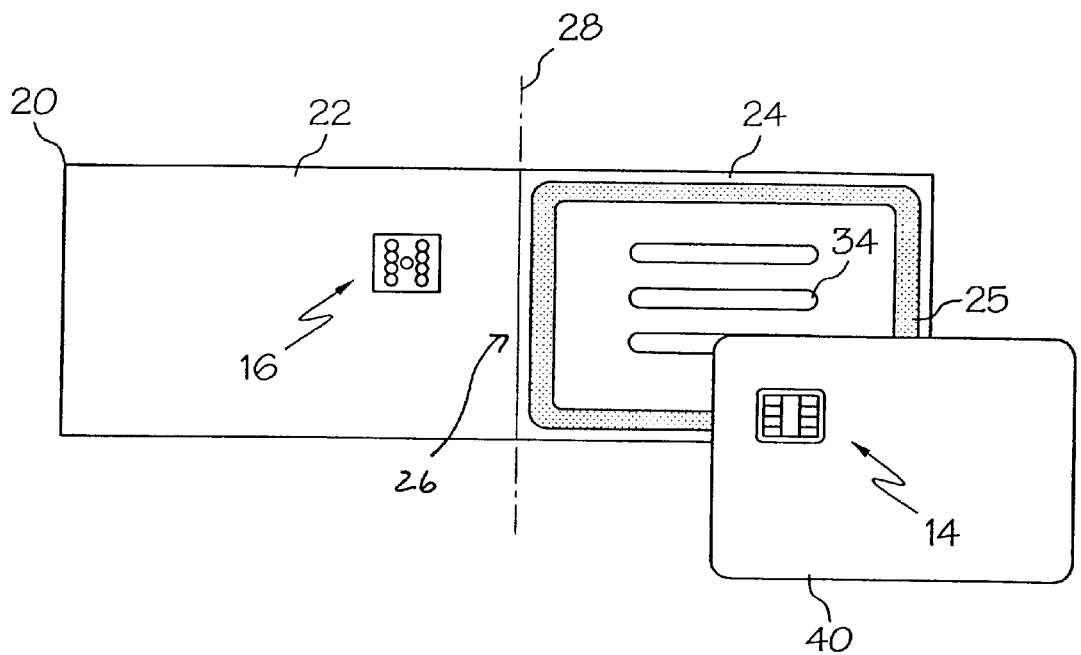
FIG. 2 is an illustration of an un-mounted integrated circuit card and reader in an open reader position according to the present invention.
Figure 3:
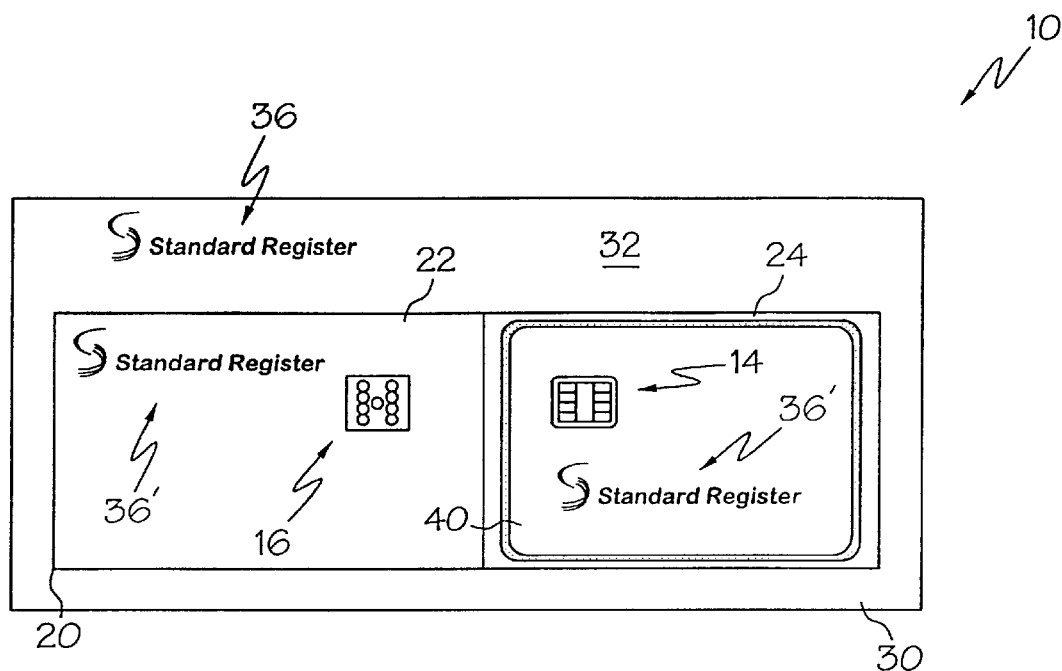
FIG. 3 is an illustration of a mounted integrated circuit card and reader according to the present invention.

Referring now to FIGS. 1–3, a business form 10 according to one embodiment of the of the present invention is illustrated. The business form 10 comprises a card reader 20, a mounting ply 30 defining a mounting surface 32, and, in certain preferred embodiments, an integrated circuit card 40. In the embodiment of the present invention illustrated in FIGS. 1–3, a contact type integrated circuit card 40 is provided and includes a plurality of electrical contacts 14 on its front surface. The reader 20 includes mating electrical contacts 16 which mate with the electrical contacts 14 on the integrated circuit card 40.

The card reader 20 defines an upper reader panel 22 and a lower reader panel 24 and the upper reader panel is coupled to the lower reader panel via a reader hinge 26. The reader hinge 26, which may merely comprise a score line on the reader 20 or a more complex conventional mechanical hinge, is arranged to enable the upper reader panel 22 to pivot relative to the lower reader panel 24 from an open reader position to a closed reader position. FIG. 1 illustrates the card reader 20 in a position intermediate the open reader position and the closed reader position. FIG. 2 illustrates the card reader 20 in the open reader position. As is illustrated in FIG. 2, the open reader position is characterized by separation of the upper reader panel 22 from the lower reader panel 24 by an angle of approximately 180° about a pivotal axis 28 defined by the reader hinge 26. The card reader 20 is removably secured to the mounting surface 32 of the mounting ply 30 in the open reader position so as to lie in a common mounting plane.

The integrated circuit card 40 is removably coupled to the mounting surface 32 via a mounting adhesive 34. The integrated circuit card 40 may be removably adhered directly to the mounting surface 32 (see FIG. 5) or may be secured to the card reader 20 and removably coupled to the mounting surface 32 via the card reader 20 (see FIGS. 3 and 4). As is illustrated in FIG. 5, the business form 10 of the present invention may comprise first and second integrated circuit cards 40, 40' removably adhered directly to the mounting surface 32. The mounting adhesive 34 may be any conventional adhesive selected to enable the integrated circuit card 40, 40' to be removably secured to the mounting surface 32 or the card reader 20, e.g., a contact, hot-melt, pressure sensitive, or moisture activated adhesive. With the exception of the above-noted preferred property of the mounting adhesive 34, the particular composition of the mounting adhesive 34 is beyond the scope of the present invention.

The card reader 20 is provided with a sealing gasket 25 arranged to seal an internal region of the card reader 20 in the closed reader position. In this manner, reader electronics may be protected from the elements after the card reader 20 is removed from the mounting ply 30 and placed in the closed reader position.

Figure 5:
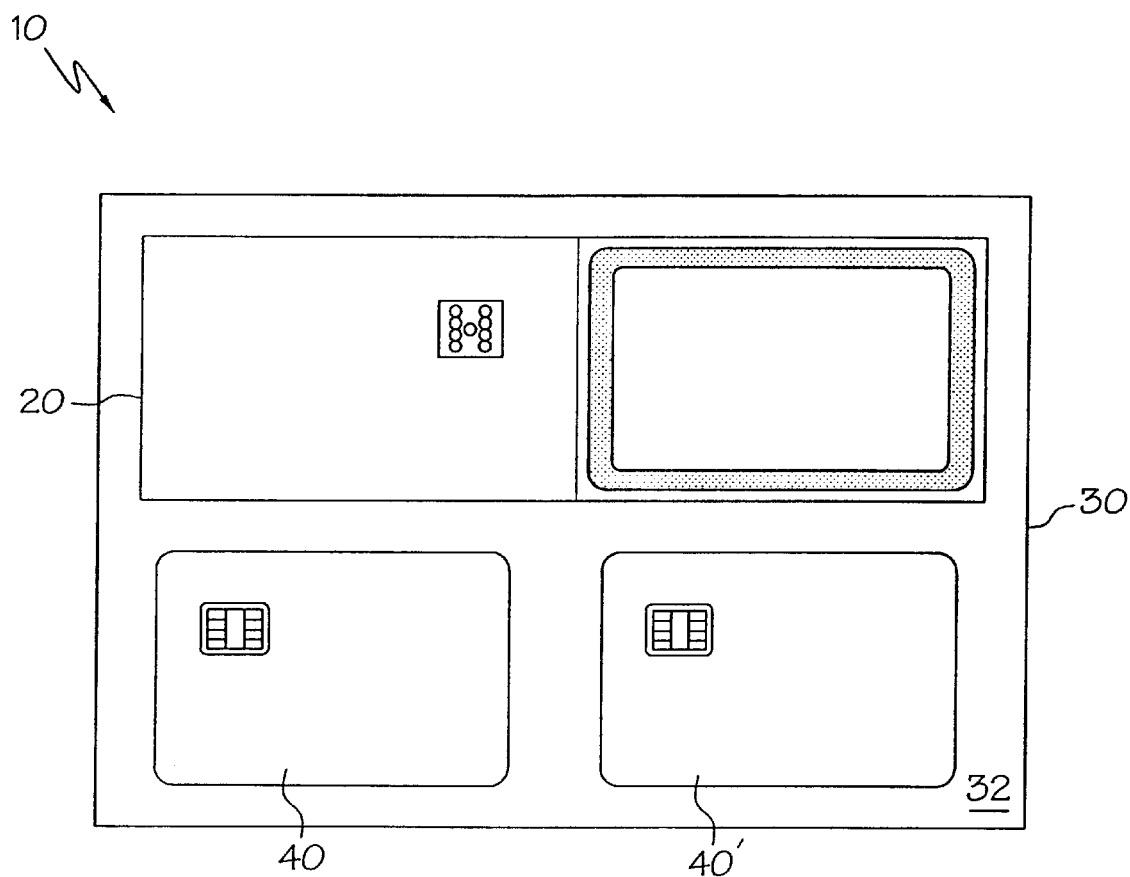
Figure 6:
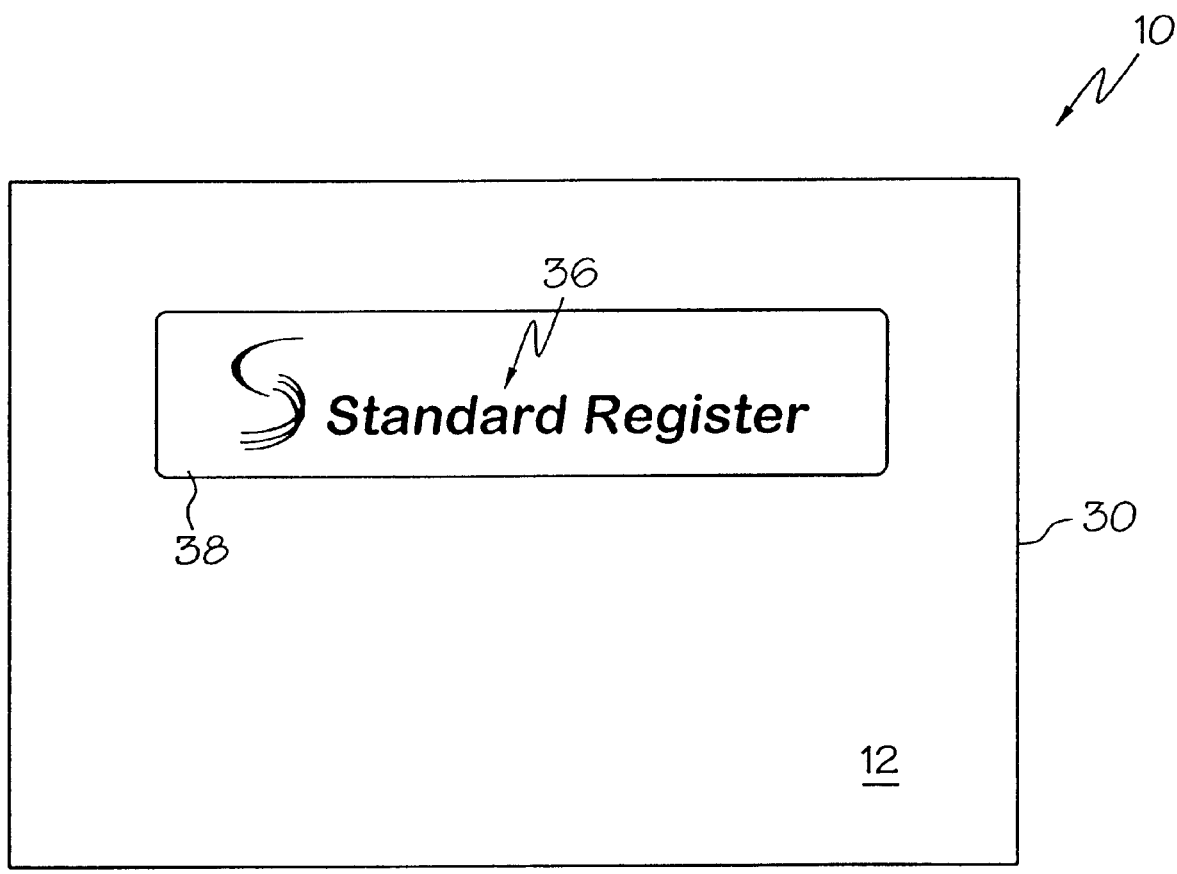
FIG. 6 is an illustration of a reverse side of the business form illustrated in FIG. 5.

Referring specifically to an aspect of the present invention illustrated in FIG. 3, the mounting surface 32 includes an image 36 printed thereon and the card 40 and the card reader 20 include respective corresponding images 36' printed thereon. Referring to an additional aspect of the present invention illustrated in FIG. 6, which is an illustration of a reverse side 12 of the business form 10 illustrated In FIG. 5, the mounting ply 30 defines a window 38 therein. The reader is positioned and removably secured to the mounting surface 32 (not shown in FIG. 6) such that an image 36 printed on the reader is aligned with the window 38. It is contemplated by the present invention that additional or alternative windows may be provided to render visible an image on a card 40, 40' (FIG. 5) or other object secured to the mounting ply 30.

As is described in detail below, the structure of the business form 10 of the present invention and the manner in which it is produced facilitates placement of matching variable images 36, 36' on each of the card mounting surface 32, the card 40, and the card reader 20. The image itself may be printed on the various parts of the business form of the present invention utilizing any one of a variety of imagers, including, for example, an ink-jet print head.

Figure 4:
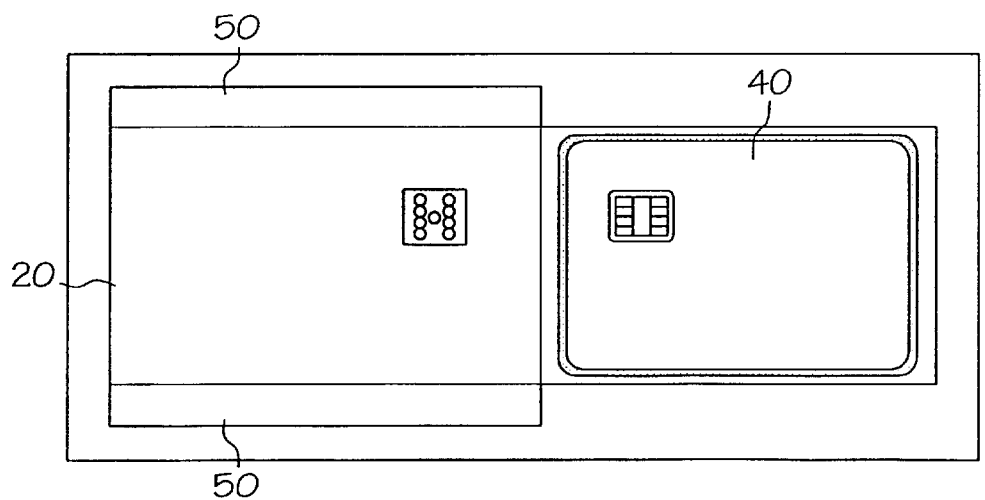
FIGS. 4 and 5 are illustrations of a mounted integrated circuit card and reader according to alternative embodiments of the present invention.

In the embodiment of the present invention illustrated in FIG. 4, the card reader 20 is provided with foldable projections 50. These foldable projections 50 are arranged to fold from a co-planar state, illustrated in FIG. 4, to a projected state, illustrated in FIG. 1. The thickness dimension of the card reader 20 in the co-planar state is less than the thickness dimension of the card reader 20 in the projected state. Accordingly, in the co-planar state, the business form 10 of the present invention is better suited for many imaging, shipping, and handling operations, while, in the folded state, the card reader 20 is better suited for use in reading information from the integrated circuit card 40. Typically, the maximum thickness of the entire business form assembly with the foldable projections 50 in the folded state is between about 60 mils (1.5 mm) and about 100 mils (2.5 mm). In the projected state, the thickness of the card reader 20 is between about 120 mils (3.0 mm) and about 240 mils (6.0 mm). The mounting ply is preferably formed from sturdy card stock having a thickness between about 7 mils (0.2 mm) and about 20 mils (0.5 mm). The integrated circuit card 40 is preferably a conventional integrated circuit card having a thickness between about 28 mils (0.7 mm) and about 40 mils (1.0 mm).

The business form 10 of the present invention is generated by removably securing the card reader 20 to the mounting surface 32 of the mounting ply 30 in the open reader position. The removably secured card reader 20 and the mounting ply 30 are then passed through an imaging device and the imaging device is operated so as to produce the images 36, 36' on a face of the secured card reader 20, the mounting ply 30, the integrated circuit card 40, or various combinations thereof. As is noted above, the image 36 may be produced on a portion of the card reader 20 aligned with the window 38. Typically, the images 36, 36' each bear matching or corresponding information and may comprise, for example, a company logo, a vendor name, etc.

In the embodiment of the present invention where the card reader is provided with the foldable projections 50, the securing step is characterized by securement of the card reader 20 to the mounting surface 32 with the projections 50 in the co-planar state. The card reader 20 is then removed from the mounting ply and the foldable projections are folded from the co-planar state into the projected state.

Having described the invention in detail and by reference to preferred embodiments thereof, it will be apparent that modifications and variations are possible without departing from the scope of the invention defined in the appended claims. For example, it is contemplated by the present invention that the reader utilized in accordance with the present invention may be affixed to the mounting ply as two separate reader panels that are arranged to be joined subsequent to their removal from the mounting ply.

What is claimed is:

1. A business form comprising:
    a mounting ply defining a mounting surface of said business form; and
    a card reader defining an upper reader panel and a lower reader panel, wherein
    said upper reader panel is coupled to said lower reader panel via a reader hinge,
    said reader hinge is arranged to enable said upper reader panel to pivot relative to said lower reader panel from an open reader position to a closed reader position,
    said open reader position is characterized by separation of said upper reader panel from said lower reader panel by an angle of approximately 180° about a pivotal axis defined by said reader hinge, and
    said card reader is removably secured to said mounting surface of said mounting ply in said open reader position.

2. A business form as claimed in claim 1 further comprising at least one integrated circuit card removably coupled to said mounting surface.

3. A business form as claimed in claim 2 wherein said integrated circuit card is removably adhered directly to said mounting surface.

4. A business form as claimed in claim 2 wherein said integrated circuit card is secured to said card reader and is removably coupled to said mounting surface via said card reader.

5. A business form as claimed in claim 2 further comprising an adhesive interposed between said integrated circuit card and said card reader, wherein said adhesive is arranged to secure said integrated circuit card removably to said card reader.

6. A business form as claimed in claim 2 wherein said business form comprises first and second integrated circuit cards removably adhered directly to said mounting surface.

7. A business form as claimed in claim 1 wherein said card reader is removably secured to said mounting surface with an adhesive.

8. A business form as claimed in claim 1 wherein said mounting surface includes an image printed thereon and wherein said card reader includes a corresponding image printed thereon.

9. A business form as claimed in claim 1 wherein said business form further comprises at least one integrated circuit card removably coupled to said mounting surface, wherein said mounting surface includes an image printed thereon, and wherein said integrated circuit card includes a corresponding image printed thereon.

10. A business form as claimed in claim 1 wherein said business form further comprises at least one integrated circuit card removably coupled to said mounting surface, wherein said mounting surface includes an image printed thereon, and wherein said card reader and said integrated circuit card include respective corresponding images printed thereon.

11. A business form as claimed in claim 1 wherein said mounting ply defines a window therein, wherein said reader is removably secured to said mounting surface such that an image printed on said reader is aligned with said window.

12. A business form as claimed in claim 1 wherein said card reader is provided with a sealing gasket arranged to seal an internal region of said card reader in said closed reader position.

13. A business form as claimed in claim 1 wherein said card reader is provided with foldable projections arranged to fold from a co-planar state to a projected state and wherein a thickness dimension of said card reader in said co-planar state is less than a thickness dimension of said card reader in said projected state.

14. A method of generating a business form comprising the steps of:
    providing a mounting ply of said business form, said mounting ply defining a mounting surface;
    removably securing a card reader to said mounting surface of said mounting ply in an open reader position, wherein
    said card reader defines an upper reader panel and a lower reader panel, said upper reader panel is coupled to said lower reader panel via a reader hinge, said reader hinge is arranged to enable said upper reader panel to pivot relative to said lower reader panel from said open reader position to a closed reader position, and said open reader position is characterized by separation of said upper reader panel from said lower reader panel by an angle of approximately 180° about a pivotal axis defined by said reader hinge;

passing said removably secured card reader and said mounting ply through an imaging device; and operating said imaging device so as to produce an image on a face of at least one of said secured card reader and said mounting ply.

15. A method of generating a business form as claimed in claim 14 wherein said image is produced on a face of said mounting ply and wherein a corresponding image is produced on a face of said card reader.

16. A method of generating a business form as claimed in claim 15 wherein said mounting ply defines a window therein and wherein said image is produced on a portion of said face of said card reader aligned with said window.

17. A method of generating a business form as claimed in claim 14 wherein said method further comprises the step of removably coupling at least one integrated circuit card to said mounting ply.

18. A method of generating a business form as claimed in claim 17 wherein said image is produced on a face of said mounting ply and wherein a corresponding image is produced on a face of said integrated circuit card.

19. A method of generating a business form as claimed in claim 17 wherein said image is produced on a face of said card reader and wherein a corresponding image is produced on a face of said integrated circuit card.

20. A method of generating a business form as claimed in claim 17 wherein said image is produced on a face of said mounting ply and wherein respective corresponding images are produced on a face of said card reader and a face of said integrated circuit card.

21. A method of generating a business form as claimed in claim 14 wherein said card reader is provided with foldable projections arranged to fold from a co-planar state to a projected state, wherein an overall thickness dimension of said card reader in said co-planar state is less than a thickness dimension of said card reader in said projected state, and wherein said securing step is characterized by securement of said card reader to said mounting surface in said co-planar state.

22. A method of generating a business form as claimed in claim 21 wherein said method of generating a business form further comprises the step of removing said card reader from said mounting ply and folding said foldable projections from said co-planar state into said projected state.

23. A business form comprising:

a mounting ply defining a mounting surface of said business form; and a card reader defining an upper reader panel and a lower reader panel, wherein said upper reader panel and said lower reader panel are removably secured to said mounting surface of said mounting ply such that said upper reader panel and said lower reader panel lie in a common mounting plane.

* * * * *

UNITED STATES PATENT AND TRADEMARK OFFICE
CERTIFICATE OF CORRECTION

PATENT NO. : 6,375,081 B1
DATED : April 23, 2002
INVENTOR(S) : Hileman et al.

It is certified that error appears in the above-identified patent and that said Letters Patent is hereby corrected as shown below:

Title page,
Item [63], Related U.S. Application Data "Division of application" should read -- Provisional Application --

Column 3,
Line 63, "of the of the" should read -- of the --

Column 4,
Line 55, "In FIG. 5" should read -- in FIG. 5 --

Signed and Sealed this

Eighth Day of October, 2002

Attest:

Attesting Officer

JAMES E. ROGAN
Director of the United States Patent and Trademark Office